United States Patent [19]
Hashimoto et al.

[11] 4,448,549
[45] May 15, 1984

[54] TEMPERATURE SENSING DEVICE

[75] Inventors: Shingo Hashimoto; Mitsuo Sekine, both of Tokorozawa, Japan

[73] Assignee: Citizen Watch Company Limited, Tokyo, Japan

[21] Appl. No.: 347,750

[22] Filed: Feb. 9, 1982

[30] Foreign Application Priority Data
Mar. 10, 1981 [JP] Japan .............................. 56-34222

[51] Int. Cl.³ .................................. G01K 7/16
[52] U.S. Cl. .......................... 374/170; 374/178
[58] Field of Search ............................ 374/170, 178

[56] References Cited
U.S. PATENT DOCUMENTS
3,809,929  5/1974  Vittos .................................. 374/170
4,121,461 10/1978  Butler et al. ......................... 374/178

FOREIGN PATENT DOCUMENTS
55-163423 12/1980 Japan .................................. 374/178

Primary Examiner—S. Clement Swisher
Attorney, Agent, or Firm—Jordan and Hamburg

[57] ABSTRACT

A temperature sensing device is disclosed which utilizes a temperature sensing circuit which generates a voltage whose level varies linearly in accordance with temperature, this voltage being produced using a pair of MOS field effect transistors which have different values of the ratio Id/K, where Id is drain current and K is the channel pattern ratio of channel width to channel length.

5 Claims, 5 Drawing Figures

TEMPERATURE SENSING DEVICE

BACKGROUND OF THE INVENTION

In the prior art, various types of electrical circuit arrangements have been utilized for temperature sensing or temperature measurement. Such devices may utilize for example the changes in frequency of free-running oscillation of a ring oscillator circuit, i.e. changes which depend upon the variation of characteristics of transistor elements of the ring oscillator circuit due to temperature changes. However the output signals indicating temperature variations which are produced by such a circuit are non-linear with respect to temperature, and in addition the relationship between such signals and temperature is not an absolute one, i.e. it is dependent upon the particular characteristics of the elements used for temperature sensing, and hence it is generally necessary to provide external adjustment means with such a circuit to provide any degree of measurement accuracy.

There is therefore a requirement for an electronic temperature sensing device which will produce output signals which are linearly related to temperature variations in an absolute manner, i.e. which does not require adjustment. Such a device is made possible by the present invention.

SUMMARY OF THE INVENTION

A temperature sensing device according to the present invention comprises a temperature sensing circuit including a pair of MOS field effect transistors with the latter circuit being designed such that the ratio of the values Id/K of each of these field effect transistors is different, where Id is the drain current of a transistor and K is the ratio of channel width W to channel length L of that field effect transistor, K being generally referred to as the channel pattern ratio. This temperature sensing circuit serves to produce an output voltage whose value varies linearly with temperature and which is defined with respect to temperature on an absolute basis. This temperature sensing voltage is amplified by a linear amplifier circuit. The amplified temperature sensing voltage is compared with a reference voltage, and a reversible counter circuit has its count contents incremented or decremented in accordance with any error between the reference voltage level and the amplified temperature sensing voltage. The count contents of the reversible counter thereby will vary linearly in accordance with temperature, if the reference voltage is independent of temperature.

DESCRIPTION OF THE PREFERRED EMBODIMENTS

Figure 1:
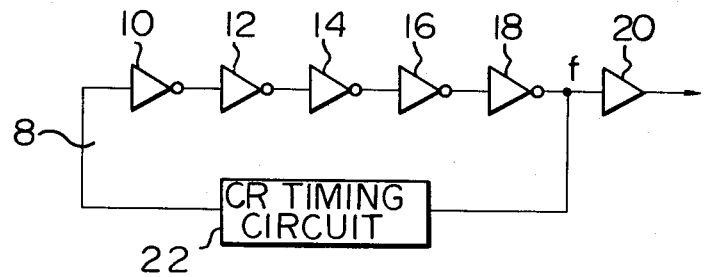
FIG. 1 is a circuit diagram of a ring oscillator circuit used as a temperature sensing circuit in the prior art.

Referring now to FIG. 1, an example of a prior art type of temperature sensing device is shown. This comprises a ring oscillator circuit 8 comprising a plurality of inverters 10 to 18 connected in series in ring configuration through an CR timing circuit 22 which establishes a capacitance-resistance time constant. A buffer inverter 20 may also be included. The free-running frequency of oscillation of such a circuit will vary in accordance with changes in ambient operating temperature. This free-running frequency of oscillation is dependent upon the average propogation delay time of the transistors which constitute inverters 10 to 18, in other words the effects of temperature changes upon the characteristics of these transistors result in changes in the frequency of oscillation of oscillator circuit 8. However the relationship between this free-running frequency of oscillation and ambient temperature is a non-linear one. In addition, the oscillation frequency is not determined on an absolute basis with respect to temperature, but only on a relative basis, in dependence on the characteristics of the elements which form ring oscillator circuit 8. Thus, to ensure that a particular output signal will be produced at some particular temperature, i.e. to ensure that a predetermined frequency of free-running oscillation is produced at that temperature, it is necessary to adjust the frequency of oscillation, for example by variation of the time constant of CR timing circuit 22. This adjustment can be performed for example by means of adjustment terminals provided external to the ring oscillator circuit 8. If a high degree of adjustment accuracy is required, then it will be necessary to provide a relatively large number of such adjustment terminals. If a ring oscillator circuit 8 is formed within an integrated circuit, in a miniature electronic device, then the provision of such terminals may be very inconvenient. It will therefore be apparent from the above that such a prior art type of temperature sensing device will not provide an output signal which varies in a linear relationship with temperature, and also that such a prior art device will generally require setting adjustment means.

Figure 2:
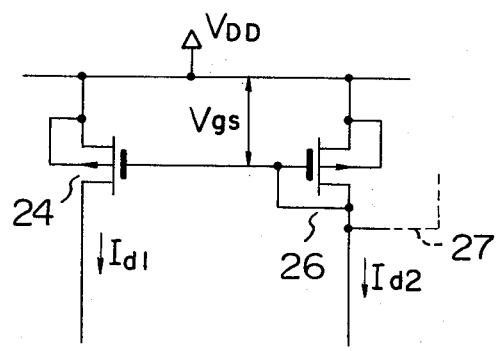
FIGS. 2 and 3 are circuit diagrams helpful in describing a current mirror circuit used in an embodiment of a temperature sensing circuit according to the present invention.

Before describing an embodiment of a temperature sensing device according to the present invention, a current mirror circuit suitable for use in a temperature sensing circuit of such a device will first be described, with reference to FIG. 2. This current mirror circuit comprises a pair of P-channel MOS field effect transistors 24 and 26, whose gate electrodes are connected in common to the drain electrode of MOS transistor 26. An identical value of gate-to-source potential Vgs is thereby applied to the gate electrodes of both of MOS transistors 24 and 26. The value of voltage Vgs will depend upon the level of drain current flowing in MOS transistor 26, since the drain-to-source voltage Vds or MOS transistor 26 is equal to Vgs. It is known that with an MOS transistor, for a given value of Vgs, the level of drain current Id which flows in the transistor, assuming constant operating temperature, is proportional to the channel pattern ratio W/L, where W is the width of the transistor channel region and L is the channel length. Thus, if the drain current of MOS transistor 24 is designated as Id1 and that of MOS transistor 26 as Id2, and if the channel pattern ratio W/L of MOS transistor 24 is designated as K1 and that of transistor 26 as K2, then the ratio of Id1/Id2=K1/K2. This will be true if transistors 24 and 26 are at the same temperature, which will be true if both transistors are formed adjacently on an integrated circuit chip. Thus, for example if K1=K2, then Id1=Id2, while if K1=10K2, then Id1=10Id2. The actual level of Id1 will be determined by that of Id2.

Similarly, if the drain electrode of MOS transistor 26 is connected to the gate electrodes of one or more other P-channel MOS transistors, e.g. by lead 27, then it will be apparent that the same relationships will be established between the drain currents of these transistors and that of MOS transistor 26 as has been described above for Id1, i.e. the ratio between the drain currents of such other MOS transistors will be determined in accordance with the ratio of the value K for these transistors with respect to the value of K for MOS transistor 26.

Figure 3:
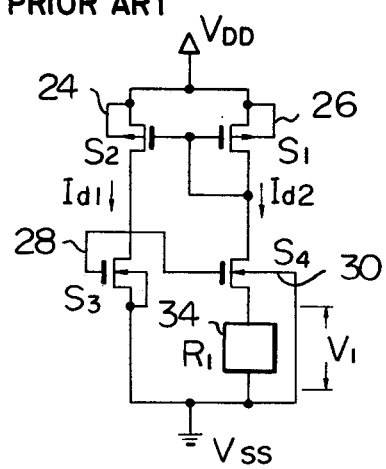

Referring now to FIG. 3, a circuit will be described which has been disclosed in the prior art, (in IEEE, Sc-12, No. 3, June '77, pp 224 to 231). This circuit produces an output voltage V1 whose level is determined by the physical quantity kT/q where k is Boltzmans constant, T is absolute temperature, and q is unit electrical charge. In other words, the value of V1 is equal to the physical quantity kT/q multiplied by the logarith (to base e) of the ratio of Id1·K4/Id2·K3, where Id1, Id2,K3 and K4 are the drain currents of MOS transistors 28 and 30 and the channel pattern ratios W/L of these transistors respectively. In FIG. 3, transistors 24 and 26 form a current mirror circuit as described above. The drain electrode of MOS transistor 26 is connected to the drain of an N-channel MOS transistor 30, whose source electrode is connected to the Vss potential through a resistor 34, and whose substrate is connected to the Vss potential. The drain electrode of MOS transistor 24 is connected to the drain and gate electrodes of an N-channel MOS transistor 28, whose substrate and source electrodes are connected to the Vss potential. The drain electrodes of MOS transistors 28 and 24 are connected to the gate electrode of MOS transistor 30. In this embodiment, it will be assumed that the values of drain current Id1 and Id2 are different, e.g. that Id1=10 Id2, while MOS transistors 28 and 30 have been manufactured to have identical values of channel pattern ratio W/L. However, it would be equally possible to make the channel pattern ratios of MOS transistor 28 and 30 different, and to make the values of drain currents Id1 and Id2 identical. In either case, the ratio of Id1 to Id2 is determined by the channel pattern ratios of MOS transistors 24 and 26 of the current mirror circuit, as described hereinabove.

With such a 10/1 ratio of drain current Id1 to Id2, and with the substrate of MOS transistor 30 connected to Vss, the circuit of FIG. 3 acts to set the drain current Id2 to a level such that a potential drop of magnitude kT/q×log 10 will appear as voltage V1 across resistor 34. This will be true so long as the drain currents Id1 and Id2 are of sufficiently low level that the relationship between log Id (to base e) and gate-to-source voltage Vgs of each transistor is linear. The value of resistor 34 can typically be of the order of 1 megohm.

From the above, it will be understood that the voltage V1 which appears across resistor 34 will vary with temperature in a manner which is absolute and predetermined, assuming that the MOS transistors 24 to 30 have been manufactured with the ratios of the channel pattern ratio W/L accurately set as described previously. However this can be readily carried out if the MOS transistors 24 to 30 are all formed within a single integrated circuit chip. Any other variations in the characteristics of MOS transistors 24 to 30 will have no effect upon the value of voltage V1, which is also independent of manufacturing variations in the value of resistor 34. It is therefore not necessary to provide external adjustment means for setting the value of voltage V1 to a predetermined value at some predetermined temperature in order to ensure temperature sensing accuracy.

The value of the output voltage V1 from the circuit of FIG. 3 is of the order of 100 mV at normal temperatures. This may be too low to be used directly as a temperature sensing voltage, for comparison with some other voltage level. It is possible to use a conventional type of amplifier circuit to increase the level of temperature sensing voltage V1 as required. However this is undesirable with prior art types of linear amplifier circuit. Since unless the amplifier circuit is relatively complex it will not be possible to avoid inaccuracy being introduced into the temperature sensing voltage level, due to such factors as variations in the offset voltage of the linear amplifier circuit when amplifying a low level voltage. This difficulty can be overcome by using a linear amplifier circuit having the configuration shown in FIG. 4. This comprises a P-channel MOS transistor 36 which is connected to the current mirror circuit of transistors 24 and 26, and a resistor 38 connected between the drain electrode of MOS transistor 36 and Vss. The gate electrode of MOS transistor 36 is connected to the gate and drain electrodes of MOS transistor 26, so that the level of drain current of MOS transistor 36, designated as Id3, is determined by the level of Id2 as described hereinabove with reference to the circuit of FIG. 2. In other words, if the channel pattern ratio W/L of MOS transistor 36 is made greater than that of MOS transistor 26, then the level of current Id3 will be proportionally higher than Id2 of MOS transistor 26. Thus in this case if the value of resistor 38 is equal to or greater than that of resistor 34, then value of voltage V2 developed across resistor 38 will be equal to voltage V1 multiplied by a constant factor, e.g. if the values of resistors 38 and 34 are identical, then V2=V1×Id3/Id2. Thus, if the W/L ratio of MOS transistor 36 is made ten times that of MOS transistor 26, then the level of Id3 will be ten times that of Id2, so that voltage V2 will be ten times voltage V1, i.e. of the order of IV at normal temperatures.

Figure 4:
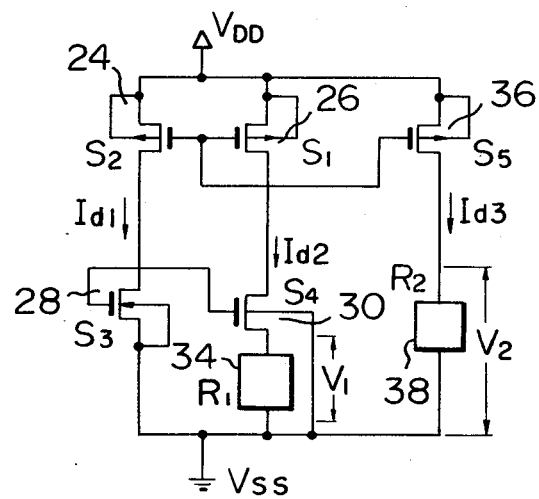
FIG. 4 is a circuit diagram of a temperature sensing circuit according to the present invention in combination with a linear amplifier circuit.

The linear amplifier circuit of FIG. 4 has the advantages of extreme simplicity, freedom from inaccuracies resulting from offset voltage variations, and a high degree of linearity even when operating at low current levels, and is highly suited for use on an integrated circuit chip.

Figure 5:
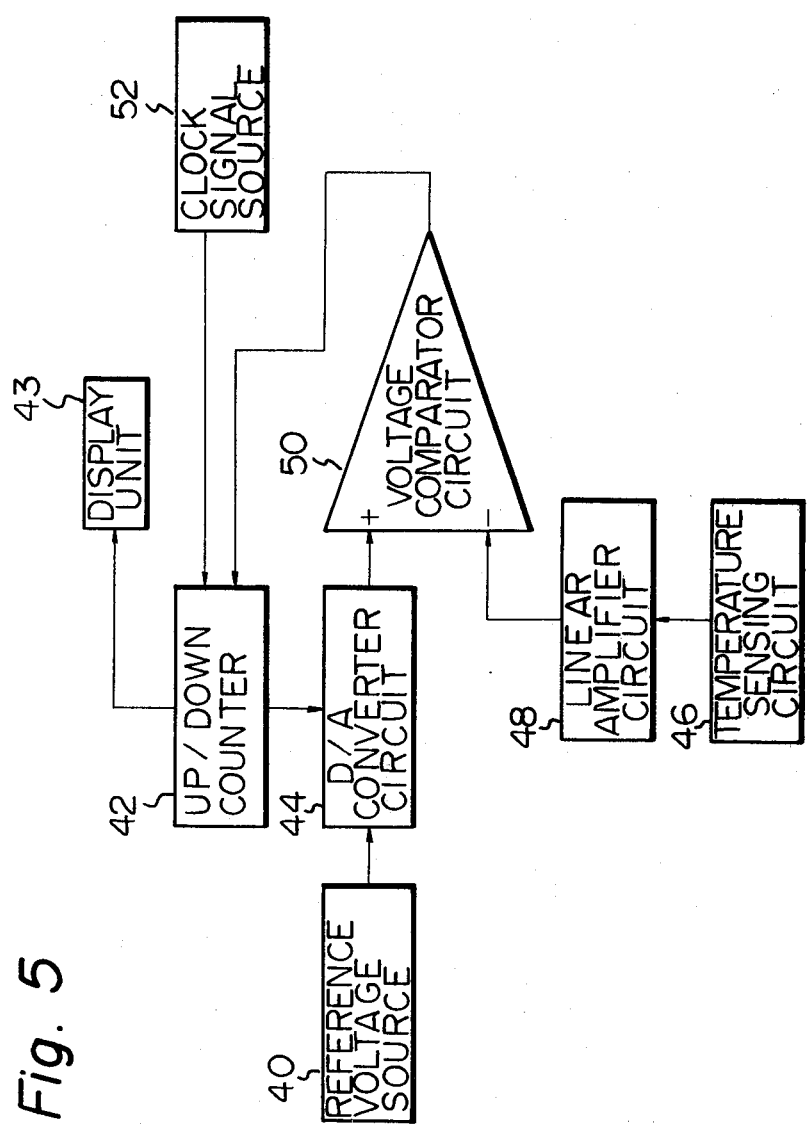
FIG. 5 is a block diagram of an embodiment of a temperature sensing device according to the present invention.

Referring now to FIG. 5, an embodiment is shown therein of a temperature sensing device according to the present invention. This comprises a temperature sensing circuit 46, which may have the configuration shown in FIG. 3 and described above, and which produces a temperature sensing voltage whose level varies linearly in accordance with changes in temperature. Temperature sensing circuit 46 is coupled to a linear amplifier circuit 48, which may have the configuration shown in FIG. 4, and serves to amplify the temperature sensing voltage from temperature sensing circuit 46, to produce an amplified temperature sensing signal which is applied to one input of a voltage comparator circuit 50. The temperature sensing device further comprises a reference voltage source 40 for producing a reference voltage which is applied to a digital-to-analog converter circuit (abbreviated hereinafter to D/A converter circuit) 44, an Up/Down counter circuit (i.e. reversible counter circuit) 42, a display unit 43 and a clock signal source 52 the reference voltage source 40 is inputted to the D/A converter circuit 44 in a manner similar to that which is shown in U.S. Pat. No. 4,072,940 issued to Simon et al and No. 4,118,699 used to Comer.

The operation of the circuit of FIG. 5 will now be described. The count contents of Up/Down counter circuit 42 are input to D/A converter circuit 44, which is responsive to the count value thereof for producing an output signal of analog form, whose level varies linearly with respect to the count value in Up/Down counter circuit 42. Display unit 43 serves to display the count contents of Up/Down counter circuit 42. The output signal from voltage comparator circuit 50 serves to control counting by Up/Down counter circuit 42 of clock pulses produced by clock signal source 52. In other words, if the level of the output signal from D/A converter circuit 44 is lower than the amplified voltage sensing signal from linear amplifier circuit 48, then the output signal from voltage comparator circuit 50 will go to a first logic level, e.g. a "0" level. This will act to enable up-counting of the clock signal pulses by Up/Down counter circuit 42, and this counting up will continue until the count value in Up/Down counter circuit 42 reaches a value such that the signal output from D/A converter circuit 44 becomes higher then the amplified temperature sensing signal from linear amplifier circuit 48. When this condition is attained, the output signal from voltage comparator circuit 50 will go to a second predetermined level, e.g. the "1" logic level. This level acts to control the Up/Down counter circuit 42 to perform counting down in response to the clock signal pulses from clock signal source 52, and this will continue until the level of the output signal from D/A converter circuit 44 again becomes less than the amplified temperature sensing signal level.

In this way, if the reference voltage level of the reference voltage source 40 is constant with respect to temperature variations, then the count contents of Up/Down counter circuit 42 will vary linearly with respect to temperature, and can be displayed directly as indicating temperature, by means of display unit 43.

As described hereinabove, use of a temperature sensing circuit such as that shown in FIG. 3 and a linear amplifier circuit such as that of FIG. 4 will enable an amplified temperature sensing signal to be produced for input to voltage comparator circuit 50 which will vary in a precisely linear manner with respect to temperature and which does not require adjustment means or selection of circuit elements for particular characteristics.

What is claimed is:

1. A temperature sensing device comprising:
   temperature sensing circuit means for producing a temperature sensing voltage whose level varies linearly with temperature;
   reference voltage generating means for producing a reference voltage whose level is independent of temperature;
   comparator circuit means for comparing said temperature sensing signal and said reference voltage signal and for producing output signals indicative of a difference therebetween; and
   circuit means responsive to said output signals from said comparator circuit means for producing signals indicative of a temperature value;
   said temperature sensing voltage circuit means comprising first and second MOS field effect transistors and circuit means for controlling the ratio between the drain currents thereof, said drain currents and the physical configurations of said first and second MOS field effect transistors being arranged such that a ratio of the drain current of said first MOS transistor to the channel pattern ratio of said first MOS transistor is different from a ratio of the drain current of said second MOS transistor to the channel pattern of said second MOS transistor, said temperature sensing circuit means being operative to set the value of said temperature sensing voltage to be directly proportional to the physical quantity $kT/q$, where $k$ is Boltzmans constant, $T$ is absolute temperature, and $q$ is unit electrical charge.

2. A temperature sensing device according to claim 1, in which said circuit means for controlling the ratio of drain currents of said first and second MOS transistors of said temperature sensing circuit means comprise third and fourth MOS transistors of opposite channel type to said first and second MOS transistors, said third and fourth MOS transistors being connected in series with said first and second MOS transistors respectively, and mutually coupled in a current mirror circuit configuration, the drain and gate electrodes of said third MOS transistor being connected in common to the gate electrode of said fourth MOS transistor, and the drain and gate electrodes of said second MOS transistor being connected in common to the gate electrode of said first MOS transistor, and further comprising a resistor coupled in series with the source electrode of said first MOS transistor, said temperature sensing voltage being developed across said resistor.

3. A temperature sensing device according to claim 1, in which said circuit xeans for producing signals indicative of a temperature value comprise;
   a clock pulse signal source for producing clock pulses;
   a Up/Down counter circuit coupled to receive said clock pulses and said output signals from said comparator circuit means; and
   a digital-to-analog converter circuit coupled to receive said reference voltage and signals indicative of the count contents of said Up/Down counter circuit;
   said digital-to-analog converter circuit being operative to produce an output signal to be applied to an input of said comparator circuit means, said output signal being proportional to the count contents of said Up/Down counter circuit and said reference voltage, said output signals from said comparator circuit means being operative to control said Up/Down counter circuit to perform counting up of said clock pulses when said temperature sensing voltage is higher than the level of said digital-to-analog converter circuit output signal and to perform counting down of said clock pulses when the temperature sensing voltage is lower than the level of said analog-to-digital converter circuit output signal, said temperature value indicating signals comprising output signals from said Up/Down counter circuit indicative of the count value therein.

4. A temperature sensing device according to claim 3, and further comprising display means coupled to receive said output signals from said Up/Down counter circuit and responsive thereto for providing a display of temperature information.

5. A temperature sensing device according to claim 1, and further comprising linear amplifier circuit means coupled between said temperature sensing circuit means and said comparator circuit means, for amplifying said temperature sensing voltage before input to said comparator circuit means.

* * * * *